Patented Feb. 2, 1954

2,668,099

UNITED STATES PATENT OFFICE 2,668,099

PROCESS OF DEWATERING LIGNOCELLU-
LOSIC MATERIALS IN THE PRODUCTION
OF FUEL

Karl Nicolaus Cederquist, Falun, Sweden, assignor to Stora Kopparbergs Bergslags Aktiebolag, Falun, Sweden, a joint-stock company of Sweden No Drawing. Application April 11, 1949,
Serial No. 86,853

10 Claims. (Cl. 44—33)

The present invention relates to improved methods for producing fuels from crude peat, peat moss and similar lignocellulosic materials containing water by pressure heating. The term similar lignocellulosic materials refers to substances which in their natural state cannot be used as fuel due to their content of water, for example peat moss (sphagnum) seaweed, grass, crude saw mill waste etc.

It is known to break the colloidal condition of crude peat by pressure heating this to 150–200° C., a peat moss being obtained which can be dewatered by filtration and/or mechanical squeezing to 30–60% dry substance. To carry out such a process, however, considerable amounts of heat are required which is to be supplied either through direct steam or by external heating or by superheating and recirculation of the vapors formed in the pressure heating system. The heating surfaces will thus be great and it is difficult to obtain a good fuel economy when heating.

The present invention has for its principal object to provide for a method to convert materials of the type described, especially peat and peat moss, to produce a solid fuel with improved dewatering properties and an increased fuel value. Other objects will be made evident from the following detailed description of the invention.

I have found that the heat necessary for the pressure heating can be obtained by direct combustion or oxidation of a certain amount of the organic substance in aqueous suspension or in a watery state by means of oxygen or oxygen containing gases under pressure. The oxidation starts at a temperature of 50° C. When the temperature is raised the speed of combustion will accelerate rapidly and the oxidation is performed very rapidly at 100° C. provided that gaseous oxygen or air enriched with oxygen is used.

Check runs on a slurry of peat containing 10% organic matter in a pressure vessel with mechanical agitating at a temperature of 190° C. and at a total internal steam and gas pressure of 20 atm. gage pressure has shown that by introducing oxygen the oxidized organic matters mainly decompose to carbon dioxide and water indicating a substantially complete combustion. The formed N. C., that is, non-condensable gases contained 95% $CO_2$ and the consumed oxygen amounted to about 80 cubic meters per ton of dry peat. Formed carbon dioxide corresponded to 7–9% of the organic substance.

As the combustion is carried through in a liquid water phase and substantially no water evaporizes, practically all the heat of the organic material will be utilized for raising the temperature of the slurry and the efficiency of the combustion will be extremely high.

Sometimes it may be suitable to add oxidation catalysts such as iron oxides, vanadium oxides etc. but mostly the peat ash contains sufficient amounts of such substances.

For obtaining the reaction between the oxygen and the organic substance it is important to provide for a satisfactory agitation. The agitation can be performed by any suitable means which will be easily understood by those skilled in the art. Thus it is possible to use mechanical stirring or to circulate steam and/or gas, for example in the way which will be described in the following in Example 3.

A pressure heating according to the lines given above can be varied within wide limits as to pressure and temperature due to several factors such as the oxygen percentage of the gases.

When using air or other gases containing a low percentage of oxygen it is of course necessary to use a proportionate higher partial pressure of the N. C. gases in the steam-gas mixture above the water peat suspension.

In several tests the total gas and vapor pressure has been varied between 10 and 200 atm. gage pressure and the temperatures between 150° and 300° C., a peat moss being obtained which can be easily dewatered mechanically.

The oxidized suspension or slurry discharged from the pressure system can at elevated pressure or atmospheric pressure be mixed with 10–50% crude peat (figured on dry basis). Tests have shown that such an addition has not essentially spoiled the dewatering property of the slurry. The amount of material which can be added advantageously will of course depend upon the physical properties of the crude peat.

For practical use a temperature of 170–220° C. is very suitable giving a satisfactory speed of reaction at a total steam-gas pressure of 20–30 atm. gage pressure when using 90–95% oxygen as oxidizing agent.

The temperatures and pressures are not restricted to the limits given but also higher values can be used; the values stated, however, being preferred when carrying out the method into practice.

The maximum temperature required is however determined by several facts such as the extent to which the material after being pressure heated is to be dewatered, the speed of reaction desired and the physical and chemical properties of the organic materials to be treated such as the temperature at which said material substantially is oxidized into carbon dioxide and water.

The carbon dioxide containing gases and vapors leaving the pressure heating system may be used for power generation or be utilized for producing pure carbon dioxide or for other suitable purposes. Their heat content may be used for heating the entering crude peat, if desired.

Exiting warm peat suspension may be used for preheating entering crude peat either directly in heat exchangers or by using the vapors liberated when lowering the pressure. Said vapors may of course also be used for power generation.

I have found that the breaking of the colloidal condition is due not only to the temperature but that the oxygen by its oxidizing effect will facilitate said breaking essentially.

The caloric value of the remaining peat is essentially higher than that of the original peat and also higher than that of the remaining product from a pressure heating process at a corresponding temperature without oxidation with oxygen. Checkruns on peat of low grade decay have shown that a pressure heating to 200° C. without oxygen yields a product which after mechanical dewatering and drying has caloric value of about 4,500 kg. cal. per kg. and a pressure heating to the same temperature using oxygen yields a product with a caloric value of 4,650 kg. cal. per kg.

Further developments of the new method have shown that it is unnecessary to add such a great amount of oxygen which is required to liberate all the heat necessary for the pressure heating. The colloidal condition can be broken in a very effective manner by adding a reduced amount of oxygen gas and compensating for decrease of exothermic heat through live steam supply or external heating.

The addition of heat above the heat developed by the oxidizing process can be carried out according to all known suitable methods, directly such as by live steam, as well as indirectly by heating surfaces. It is also possible to use both these methods in combination. Indirectly the heat can be added either to the peat suspension or to its vapor, which then is maintained circulating through the suspension.

The following examples are submitted in further illustration of the invention and are not to be taken as in any way restrictive of the scope of the invention.

*Example 1*

A pressure vessel with internal mechanical agitating, in which a temperature of 170° C. is maintained, is continuously fed with a slurry of crude peat preheated to about 120° C. and containing about 10% organic substance. The temperature is maintained at 170° C. by introducing oxygen gas against a total internal pressure of 20 atm. gage pressure and removing continuously the formed carbon dioxide together with a certain amount of steam. The heated slurry continuously removed is allowed to expand in three steps down to vacuum corresponding to a boiling point of 50° C. Liberated steam is used as live steam to preheat the crude peat through direct condensation of the steam in the peat suspension raising the temperature of entering slurry from about 20 to 120° C. About 8–10% of the organic matter has been oxidized or decomposed to carbon dioxide.

*Example 2*

Into a pressure vessel, in which the temperature is 190° C., is fed a peat-water slurry containing 20% dry substance and preheated to 140° C. By supplying oxygen against the internal pressure of 20 atm. gage pressure the temperature is maintained constant. The peat slurry treated in such a manner is removed continuously and its heat content is used for preheating entering peat. Uncondensable gases and a certain amount of vapor are removed from the pressure vessel simultaneously.

The resulting peat slurry is freed from water by filtration and squeezing after addition of 25% untreated peat.

*Example 3*

A thick running paste of peat containing 27% dry substance and preheated to 150° C. is continuously pumped into a pressure vessel in which the temperature is 200° C. and the total steam gas pressure 30 atm. gage pressure. One part of the heat necessary for raising the temperature of the entering suspension up to 200° C. is obtained indirectly by recirculating steam and N. C. gases via a superheater through the suspension in which the superheat is given off under violent agitation and the other part of the heat is obtained by introducing oxygen of 90–95% purity. N. C. gases formed are removed permanently and the peat slurry formed is removed continuously through a heat exchanger preheating the entering suspension to 150° C. The resulting product is filtered and squeezed in a continuously operating press. The remaining solid material contains 50–60% dry substance and is dried to 90% dryness and compressed to briquettes.

In order to facilitate the oxidation further, and if suitable, to bind acid components formed, basic reacting substances may be added, such as carbonates, hydrates and oxides of the alkali metals and/or the alkaline earth metals.

It is also possible to carry out the oxidation in an acidified phase by adding organic and/or inorganic acids to the slurry by which means a hydrolyzation of the cellulosic matters takes place forming fermentable sugars that can be of particular interest when treating peat-moss (sphagnum) of a low grade of decay or vegetable material containing cellulose.

*Example 4*

A sawdust water slurry of a temperature of 130° C. containing 12% sawdust and 0.5% sulfuric acid is continuously fed into a pressure vessel in which the temperature is 180° C. and the total internal steam-gas pressure 25 atm. The temperature is maintained constant by supplying steam and oxygen of 90% purity continuously and withdrawing the formed carbon dioxide together with non-condensable gases and a certain amount of steam.

The treated slurry is continuously removed and liberated steam used for preheating entering slurry.

The resulting product is filtered and remaining solids dried and compressed to fuel briquettes. The filtrate is neutralized and fermented.

The peat treated with oxygen can be freed from water wholly or partly and be used as raw material for chemical production such as carbonisation, conversion to carbon monoxide and hydrogen, hydrogenation and so on.

The by-products obtained when pressure heating the peat such as organic acids, alcohols etc. can be recovered from the solution obtained or from its distillates, by means of known methods such as evaporation, extraction or distillation.

Due to the perfect combustion of lignocellulosic materials with oxygen under pressure-heating in the presence of considerable quantities of water rendering a direct combustion impossible, this invention is not limited to peat or peat-moss. All kinds of vegetable materials containing considerable amounts of water can be treated in the same manner leaving a solid residue with an increased caloric value which easily can be freed from excess of water.

The process can be carried out in a neutral, alkaline or acidified water phase. Especially when treating materials rich in cellulose or starch such a simple pressure heating process in acidified water phase is of importance. The production of solid fuels can be combined with the production of fermentable sugar solutions for manufacturing alcohols, ketones and other fermentation products.

Having now particularly described and ascertained the nature of my said invention, and in what manner the same is to be performed, I declare that what I claim is:

1. In the treatment of lignocellulosic materials, including peat, containing substantial amounts of water to dewater them in the production of fuel therefrom involving heating said material under pressure at a temperature of at least about 150° C. and then mechanically separating water from the treated material, the improvement which comprises supplying at least a substantial portion of the heat by subjecting said material, under pressure, to the action of oxygen-containing gas to substantially completely oxidize a small portion of said material to carbon dioxide and water with the liberation of heat, and then mechanically separating water from the treated material.

2. The process of claim 1 wherein the material is heated under pressure to between about 170° C. and about 220° C.

3. In the treatment of lignocellulosic materials, including peat, containing substantial amounts of water to dewater them in the production of fuel therefrom involving heating said material under pressure at a temperature of at least about 150° C. and then mechanically separating water from the treated material, the improvement which comprises subjecting a slurry of said material to heat to raise it to a temperature of at least about 50° C. and introducing oxygen-containing gases into said slurry in a pressure vessel under pressure to substantially completely oxidize a small portion of said material to carbon dioxide and water with the liberation of heat, said liberated heat at least in part raising the temperature of said slurry to at least about 150° C.; removing carbon dioxide-containing gases that are formed; removing the heated slurry, and mechanically separating water from the slurry.

4. The process of claim 3 wherein the slurry comprises also an oxidation catalyst.

5. The process of claim 3 wherein an acid is added to said slurry before said oxidation.

6. The process of claim 3 wherein the material is preheated to at least about 100° C.

7. In the treatment of lignocellulosic materials, including peat, containing substantial amounts of water to dewater them in the production of fuel therefrom involving heating said material under pressure at a temperature of at least about 150° C. and then mechanically separating water from the treated material, the improvement which comprises subjecting a slurry of said material to heat to raise it to at least about 50° C. while continuously feeding said slurry into a pressure vessel; continuously introducing oxygen-containing gases into said vessel under pressure; continuing heating of said slurry in said vessel to at least about 150° C., at least a substantial portion of the heat being supplied by the substantially complete oxidation of a small portion of said material to carbon dioxide and water by the action of said oxygen; removing non-condensible gases that are formed; continuously removing the heated slurry, and mechanically separating water from the slurry.

8. The process of claim 7 wherein a portion of the heat is supplied from an external source.

9. The process of claim 8 wherein steam is also introduced into said pressure vessel, and wherein a portion of the heat is supplied by said steam.

10. In the treatment of lignocellulosic materials, including peat, containing substantial amounts of water to dewater them in the production of fuel therefrom involving heating said material under pressure at a temperature of at least about 150° C. and then mechanically separating water therefrom, the improvement which comprises preheating a slurry of said material to at least about 50° C.; continuously feeding said preheated slurry into a pressure vessel; continuously introducing oxygen-containing gases into said vessel under pressure; heating said slurry in said vessel to at least about 150° C., at least a substantial portion of the heat being supplied by the substantially complete oxidation of a small portion of said material to carbon dioxide and water by the action of said oxygen; continuously removing non-condensible gases that are formed and said heated slurry; preheating entering feed slurry with the heat in said removed gases and slurry, mechanically separating water from the slurry, and drying the mechanically separated solids using heat from subsequently removed gases and heated slurry.

KARL NICOLAUS CEDERQUIST.

References Cited in the file of this patent

FOREIGN PATENTS

| Number | Country | Date |
|---|---|---|
| 135,578 | Great Britain | Nov. 25, 1919 |
| 256,327 | Great Britain | Aug. 9, 1926 |
| 644,440 | France | June 5, 1928 |
| 721,000 | Germany | July 3, 1942 |